United States Patent [19]
Dawson

[11] Patent Number: 4,726,252
[45] Date of Patent: Feb. 23, 1988

[54] SPRING-BACK BIKE LEVER

[76] Inventor: Raymond M. Dawson, P.O. Box 79, Modbury, Australia, 80921

[21] Appl. No.: 844,192

[22] Filed: Mar. 26, 1986

[30] Foreign Application Priority Data

Mar. 29, 1985 [AU] Australia .................. PG9957

[51] Int. Cl.$^4$ .............. G05G 1/04; G05G 5/06; G05G 11/00; F16D 63/00
[52] U.S. Cl. ...................... 74/523; 74/524; 74/488; 74/527; 74/528; 188/265
[58] Field of Search ............ 74/523, 528, 524, 527, 74/488, 489, 475, 525, 551.9, 501 R; 188/265; 192/13 A

[56] References Cited

U.S. PATENT DOCUMENTS

| | | | |
|---|---|---|---|
| 670,416 | 3/1901 | Cronk | 74/523 |
| 2,545,279 | 3/1951 | Henderson | 74/523 |
| 2,917,944 | 12/1959 | Hills | 74/523 |
| 3,486,397 | 12/1969 | Roock et al. | 74/523 |
| 3,645,151 | 2/1972 | Yoshikawa | 74/551.9 |
| 3,733,922 | 5/1973 | Tripp | 74/523 |
| 3,800,618 | 4/1974 | Yoshigai | 74/489 |
| 3,803,941 | 4/1974 | Yoshikawa | 74/523 |
| 3,845,847 | 11/1974 | Camp | 74/489 |
| 3,948,361 | 4/1976 | Carlson | 188/265 |
| 4,318,307 | 3/1982 | Kine | 74/489 |
| 4,476,643 | 10/1984 | Hilchey et al. | 74/523 |
| 4,667,785 | 5/1987 | Toyoda et al. | 74/501 R |

FOREIGN PATENT DOCUMENTS

| | | | |
|---|---|---|---|
| 0018929 | 11/1980 | European Pat. Off. | 74/488 |
| 0047637 | 3/1982 | European Pat. Off. | 74/489 |
| 0067692 | 12/1982 | European Pat. Off. | 74/523 |
| 1039864 | 9/1958 | Fed. Rep. of Germany | 74/551.9 |
| 2481221 | 10/1981 | France | 74/501 R |
| 241997 | 11/1925 | United Kingdom | 74/475 |
| 2167839 | 6/1986 | United Kingdom | 74/501 R |

Primary Examiner—Gary L. Smith
Assistant Examiner—Vinh Luong
Attorney, Agent, or Firm—Barnes & Thornburg

[57] ABSTRACT

A brake or clutch lever system for a motor cycle or a pedal cycle, the lever system having a lever pivoted to a lever housing. The lever housing is pivoted to a clamping bracket and is biased by a spring into an extended position, stop members holding the lever housing in the extended position. The lever housing pivots upwardly on impact to thus minimize breakage of the lever system.

19 Claims, 3 Drawing Figures

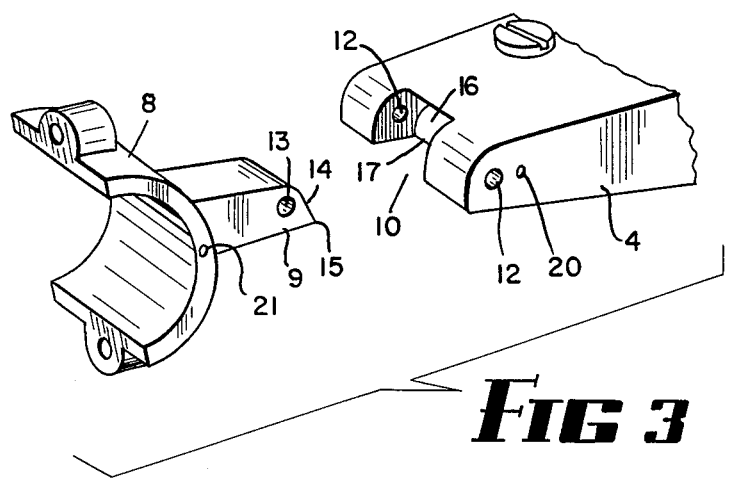

SPRING-BACK BIKE LEVER

This invention relates to a spring-back brake and clutch lever system for motor cycles, more particularly for off-road motor cycles than on-road motor cycles.

BACKGROUND OF THE INVENTION

With off-road motor cycles, particularly dirt and trail motor cycles, falls and spills often occur. As the motor cycles often fall with the handle bars striking the ground or other objects such as rocks, logs and trees, one of the major causes of breakages occur to the clutch and break levers mounted on the handle bars, due to the fact that these protrude forwardly of the handle bars. Thus, on impact due to the rigid nature of the levers and their rigid mounting on the handle bars, breakage occurs either on the lever itself or its mounting or clamping bracket on the handle bars.

It is an object of this invention to provide a lever mounted on the handle bars so that the lever would deflect upon impact to thus lessen the likelihood of breakage.

BRIEF STATEMENT OF THE INVENTION

Thus, there is provided according to the invention, a spring-back lever system for mounting on the handle bars of cycles or motor cycles, the lever system comprising a clamping member for clamping onto the handle bars of the motor cycle, and a lever housing pivoted to the clamping member to pivot from an extended position to a retracted position against the bias of a spring, stop means being provided to locate the lever housing in the extended position.

BRIEF DESCRIPTION OF THE DRAWINGS

In the drawings,

FIG. 3 is an exploded view of a portion of the lever system.

DESCRIPTION OF THE PREFERRED EMBODIMENT

Figure 1:
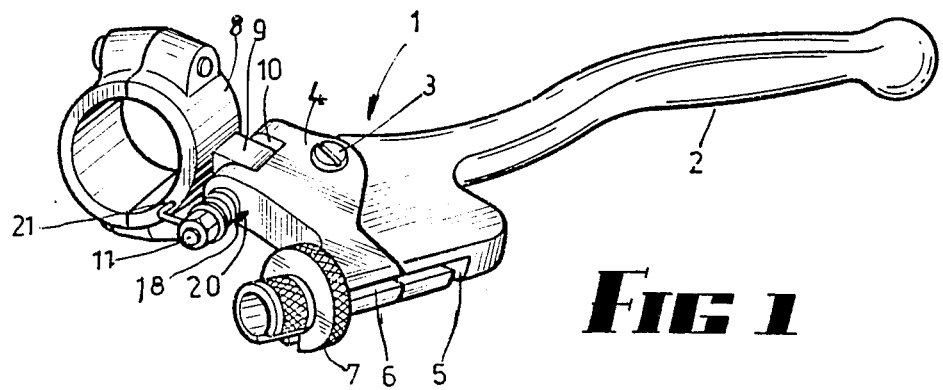
FIG. 1 shows a perspective of the lever system in the extended position.
Figure 2:
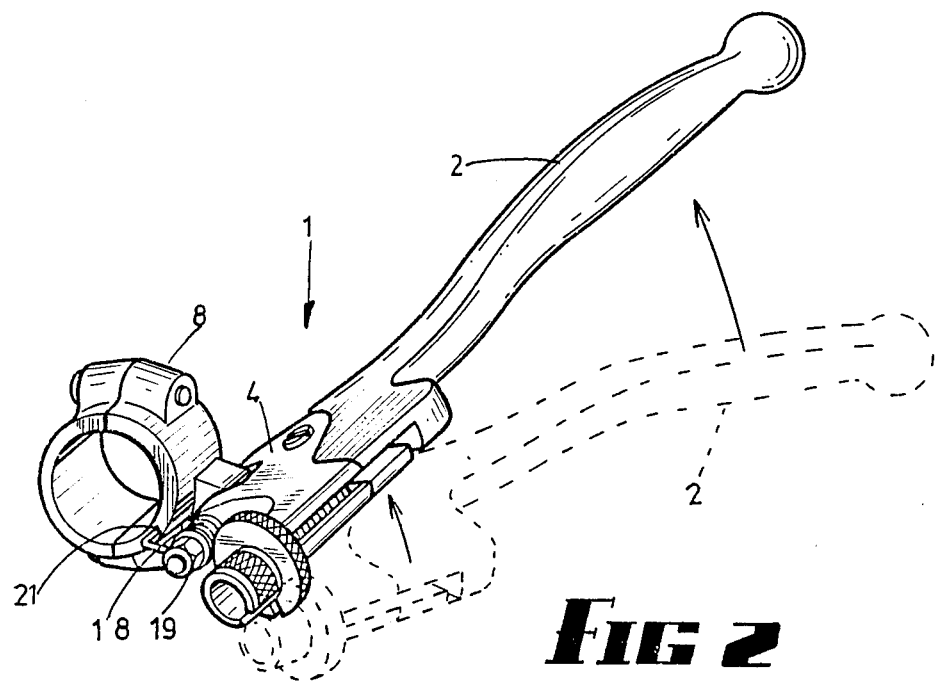
FIG. 2 shows a perspective of the lever system in the retracted position in full lines and in the extended position in dotted lines.

The lever system 1 as shown in the drawings is directed to a lever system on the left hand handle bar of a motor cycle, and shows a lever 2 pivoted by mounting bolt 3 to a lever housing 4. The lever 2 has a conventional slit 5 for receiving the end of the cable, either a clutch or brake cable, while the lever housing 4 has its appropriate cable slot 6 and cable adjustor 7.

The lever housing 4 is pivoted to a handle bar mounting bracket 8, being of two parts which are bolted to the handle bar (not shown).

The bracket 8 has a male hinge portion 9 engaged in a female hinge portion 10 in the lever housing 4, the two hinge portions being joined by a hinge pin 11 passing through holes 12 and 13 in the lever housing 4 and the male hinge portion 9 respectively.

The male hinge portion 9 has an outer curved surface 14 curving downwardly to end in a stop 15, while the inner surface 16 of the female hinge portion 10 is curved to end in a stop portion 17. These two curved portions are so shaped that, as shown in the drawings, the lever housing 4 can pivot from the horizontal position upwardly, while in the horizontal position the respective stops 15 and 17 engage to prevent the lever housing pivoting downwardly past the horizontal position.

In order to maintain the lever housing 4 in the horizontal position in normal conditions, the pivot pin 11 carries a return spring 18 retained on the pivot pin by a nut and washer 19. One end of the return spring 18 is engaged in an aperture 20 in the lever housing 4, and the other end of the return spring is engaged in an aperture 21 in the bracket.

It will be seen that the combination of the spring and the stops on the two hinge portions maintain the lever housing in its correct extended position for normal use, this correct extended position being generally referred to as horizontal.

Upon impact of the lever or housing striking the ground or other object in the event of a fall, the impact will cause the lever housing to pivot upwardly against the action of the spring thus minimizing and in many cases preventing breakage of the lever, its housing or bracket.

While the preferred embodiment has been described in relation to a lever on the left of the handle bar, it is to be realized that the invention can also be applied to levers on the right-hand side by suitable reversal of the features in the component parts for the right-hand lever system.

Also, the invention can be applied to other vehicles and machines, such as pedal cycles and machines having lever and cable controls.

I claim:

1. A lever system for mounting on a handlebar of a cycle or the like, the lever system comprising
   a clamping fixture,
   a lever,
   connection means for interconnecting the clamping fixture and the lever,
   first hinge means for pivotally mounting the connection means on the clamping fixture for pivotable movement between operating and retracted positions about a first pivot axis, and
   second hinge means for pivotally mounting the lever on the connection means in a spaced-apart relation to the clamping fixture for pivotable movement about a second pivot axis, the second hinge means being oriented relative to the first hinge means to align the second pivot axis in angular non-parallel relation to the first pivot axis.

2. The lever system of claim 1, further comprising spring means for yieldably biasing the connection means from its retracted position toward its operating position so that the connection means is returned to its operating position following a retraction-inducing impact to at least one of the connection means and the lever.

3. The lever system of claim 2, wheren the spring means acts between the clamping fixture and the connection means.

4. The lever system of claim 1, wherein the clamping fixture includes a first stop member, the connection means includes a second stop member, and the first and second stop members cooperate to provide means for limiting pivoting movement of the connection means relative to the clamping fixture to define said retracted position of the connection means.

5. The lever of claim 4, further comprising spring means acting between the clamping fixture and the connection means for yieldably urging the second stop member in a direction away from the first stop member to locate the connection means in its operating position.

6. The lever of claim 1, wherein the clamping fixture includes a male pivot portion, the connection means is formed to include a female pivot portion, and the first hinge means includes a pivot pin connecting the male pivot portion to the female pivot portion.

7. The lever system of claim 6, wherein the male pivot portion has a curved outer end configured to provide a first stop member at its distal end and the female pivot portion has a curved portion configured to provide a second stop member at its distal end, the first and second stop members cooperating to limit movement of the connection means so that the connection means in its operating position is situated in generally horizontal alignment with the male pivot portion.

8. The lever of claim 1, wherein the first and second hinge means are oriented to align the second pivot axis in orthogonal non-intersecting relation to the first pivot axis.

9. The lever system for mounting on a handlebar of a cycle or the like, the lever system comprising
   a lever,
   a clamping fixture formed to include an inner wall defining a handlebar-receiving passageway having a central axis extending therethrough,
   a lever housing,
   first hinge means for mounting the lever housing on the clamping fixture for pivotable movement about a first pivot axis aligned in substantially parallel relation to the central axis of the handlebar-receiving passageway, and
   second hinge means for mounting the lever on the lever housing for pivotable movement about a second pivot axis, the second hinge means being oriented non-parallel relative to the first hinge means to define a predetermined angle between the first and second pivot axes.

10. The lever system of claim 9, wherein the clamping fixture includes a first stop member, the lever housing includes a second stop member, and the first and second stop members cooperate to provide means for limiting pivoting movement of the lever housing relative to the clamping fixture to define a retracted position.

11. The lever system of claim 10, further comprising spring means acting between the clamping fixture and the lever housing for yieldably urging the second stop member in a direction away from the first stop member to locate the lever housing in an operating position away from the retracted position.

12. The lever system of claim 9, wherein said predetermined angle is about 90° and the first and second pivot axes are aligned in non-intersecting relation.

13. A spring-back lever system for mounting on a handlebar of a cycle or the like, the lever system comprising
   lever means for operating a cable,
   a lever housing,
   first pivot means for pivotally coupling the lever means to the lever housing,
   a clamping member having means for clamping to a selected portion of the handlebar,
   a return spring acting between the lever housing and the clamping member,
   second pivot means for pivotally coupling the lever housing to the clamping member, the second pivot means having a second pivot axis extending generally non-parallel to a first pivot axis of said first pivot means, and
   stop means interconnecting the lever housing and the clamping member for locating the lever housing in an operating position, whereby the lever housing can deflect to a retracted position about said second pivot means against the bias of the return spring.

14. The spring-back lever system of claim 13, wherein the clamping member includes a male pivot portion, the lever housing is formed to include a female pivot portion, and the second pivot means includes a pivot pin connecting the male pivot portion to the female pivot portion.

15. The spring-back lever system of claim 14, wherein the male pivot portion has a curved outer end ending in a first stop, the female pivot portion has a curved portion ending in a second stop so that when the stops are engaged, the lever housing is extended in said operating position generally horizontally of the male pivot portion.

16. The spring-back lever system of claim 13, wherein one end of the return spring is attached to the lever housing and the other end of the return spring is attached to the clamping member to bias the lever housing to an extended position.

17. The spring-back lever system of claim 13, wherein the lever housing pivots upwardly against the action of the return spring.

18. The spring-back lever system for mounting on a handlebar of a cycle or the like, the lever system comprising
   a lever assembly.
   a clamping fixture formed to include an inner wall defining a handlebar-receiving passageway having a central axis extending therethrough,
   first hinge means for mounting the lever assembly on the clamping fixture for pivotable movement between a retracted position and an operating position about a first pivot axis aligned in substantially parallel relation to the central axis of the handlebar-receiving passageway, and
   return spring means acting between the clamping fixture and the lever assembly for yieldably biasing the lever assembly from its retracted position toward its operating position so that the lever assembly is returned to its operating position following a retraction-inducing impact to the lever assembly wherein the lever assembly includes a lever, a lever housing, and a second hinge means for mounting the lever on the lever housing for pivotable movement about a second pivot axis, and the second hinge means is oriented non-parallel relative to the first hinge means to align the second pivot axis in angular relation to the first pivot axis.

19. The spring-back lever system of claim 18, wherein the clamping fixture includes a first stop member, the lever assembly includes a second stop member, and the first and second stop members are engageable in response to predetermined relative movement of the clamping fixture in the lever assembly to limit pivoting movement of the lever housing against the bias provided by the return spring means, thereby defining the retracted position.

* * * * *